INVENTOR.
ROBERT K. ALLEN
BY Joseph V. Claeys
HIS ATTORNEY

United States Patent Office 3,353,019
Patented Nov. 14, 1967

3,353,019
AUTOMATIC CONTROL SYSTEM FOR VEHICLES INCORPORATING A RANGING SYSTEM FOR VEHICLE TRAFFIC SAFETY CONTROL
Robert K. Allen, Erie, Pa., assignor to General Electric Company, a corporation of New York
Filed Jan. 3, 1966, Ser. No. 518,057
9 Claims. (Cl. 246—187)

This invention relates to automatic control systems for vehicles of the type wherein the vehicle is controlled in accordance with electrical signals and, more particularly, to such systems wherein traffic safety is controlled in accordance with a ranging system. Although not limited thereto, the present invention is especially suited for automatically controlling the operation of vehicles following a fixed route, such as railway vehicles, and will be particularly described in that connection.

In railway systems, such as rapid transit systems and the like, for example, the vehicles must be operated in compliance with various local route speed limits as well as in compliance with the particular traffic conditions existing in advance of the vehicle. In the existing railway signaling systems, the block system is employed and the condition of traffic in advance is indicated in terms of the particular block in which the vehicle ahead is located. While various arrangements may be employed depending upon track density and speeds, a typical block system may be arranged to indicate whether the first block in advance, the second block in advance or neither of such blocks is occupied. In such a three-level block system, for example, the block immediately behind the occupied block would be assigned the red or stop indication; the next following block, the yellow or approach with caution indication; and the third block behind the occupied block would be assigned the green or clear indication which would permit vehicle operation at maximum speed consistent with the local route speed limit. In such a system, therefore, it is apparent that the length of each block is determined by the running speeds permitted and the braking capacity of the vehicles being operated. Thus, the red block must be long enough to permit stopping from yellow speed and the yellow block must be long enough to permit vehicle retardation from the green to the yellow speed.

Existing automatic train control and cab signaling systems employ the block system and vehicles may be provided with apparatus responsive to coded track currents to provide a visual indication of maximum permissible speed corresponding to the local track speed limit and the existing condition of traffic in advance. Apparatus may also be provided to effect an automatic application of brakes if the vehicle enters a track section indicating a more restrictive signal aspect than the preceding track section unless the operator within a predetermined time interval manually applies the brakes to slow or stop the vehicle.

With the increasing demands being placed on railway systems, especially urban rapid transit systems, there has been a growing need to provide for the fully automatic operation of vehicles. That is, wherein no engineman or other operating personnel are required for vehicle operation and where control is achieved in accordance with electrical command signals from wayside. Such an automatic vehicle control system is described and claimed in the co-pending application of Allen and Lichtenfels entitled, "Automatic Control System for Vehicles," Ser. No. 418,132 filed Dec. 14, 1964, and assigned to the same assignee as the present invention. As described in that application, the wayside command signals may be provided by any suitable signaling or communication system such as, for example, the existing railway signaling systems.

It had been recognized in the art that the block system possessed certain inherent limitations which limit track capacity in railway systems, especially rapid transit systems where such factors as maximum track usage, vehicle speed, vehicle spacing, vehicle headway (time spacing) and safety are so very important. For example, in the block system, fixed block lengths are required with considerable interblock wiring and, since vehicle presence is expressed in terms of the block in which the vehicle in advance is located, uncertainty exists to an extent dependent upon the block length as to the exact distance of each vehicle in advance. Although track usage can be increased in such systems by employing more and shorter block lengths providing a higher level system, such systems become extremely expensive due to the multiplication of equipment and to the considerable interblock wiring which is required. Moreover, blocks shorter than the train length offer no advantage except at known stop points, such as stations, since the train ahead would always bridge two track sections and show occupancy in both blocks.

In view of the problems presented by the inherent limitations of the block system, attempts were made in the prior art to provide systems which would be capable of more precisely indicating the distance between the vehicle and an obstruction in advance. An improved system of this type is described and claimed in the co-pending application of Bolster et al. entitled "Ranging Systems," Ser. No. 297,789 filed July 26, 1963, now Patent No. 3,305,683 and assigned to the same assignee as the present invention. In that system, a range signal is continuously derived from transmitted and reflected wave energy in a transmission line which extends along the route of travel of the vehicle. Since the system of that application is so especially suited for measuring the distance between a vehicle and another vehicle in advance, the present invention will be particularly described in connection with such ranging system. It is to be understood, however, that any suitable ranging system may be utilized in the present invention.

While the inherent limitations of the block system present serious problems in the operation of any rapid transit system, such problems become more and more intolerable in high performance automatically operated systems wherein, in order to realize the full potential thereof, vehicles must be permitted to be operated at high speed and close spacing with absolute safety.

In the application of Bruce A. Wells, Ser. No. 518,171, filed concurrently herewith, there is disclosed and claimed a new and improved arrangement incorporating a range signal, from a suitable ranging system, into a system for automatically controlling the operation of vehicles so that safe operation of the vehicles is provided in accordance with wayside signals representing only the local track speed limit.

The system of the present invention is similar to that of the foregoing Wells invention in that it also utilizes a range signal to provide the function of vehicle separation safety, or minimum vehicle spacing. The system of the present invention differs, however, in the manner in which the range signal is utilized and implemented. For example, whereas in the Wells invention the range signal is converted to a maximum velocity signal corresponding to that range, in the present invention the range signal is operative to provide discrete range aspect indications depending upon the value of the range signal.

While the system of the foregoing Wells invention is entirely satisfactory, it is desirable that further development of automatic vehicle control systems be made in order to provide flexibility to best accommodate the many different environments and specific applications which require automatic vehicle operation.

It is an object of this invention, therefore, to provide a new arrangement for utilizing a range signal from a vehicle-carried ranging system to provide for vehicle safety control.

It is another object of this invention to provide an automatic vehicle control system which requires only vehicle local track speed limit indicating signals from wayside and which provides for absolute safe vehicle operation at high vehicle speeds and close vehicle spacings.

Briefly stated, in accordance with one aspect of this invention, a new system is provided for automatically controlling the operation of vehicles in accordance with local route conditions, as represented by wayside electrical signals indicative of local route speed limits, and the existing condition of the route in advance of the vehicle, as represented by a range signal derived on board the vehicle. The system includes means on board the vehicle for deriving a range signal which increases in value as a function of increasing distance between the vehicle and an object in advance. This range signal is applied, in common, to a plurality of threshold sensing devices each of which is arranged to be actuated at a different signal value so that the devices are sequentially actuated as a function of increasing value of the range signal and with each such device being operative to provide a discrete range, or vehicle separation, aspect indication. The system also includes means for receiving signals from wayside indicating maximum local route speed limits and translating such received speed limit signals to provide different specific vehicle speed aspect indications corresponding to such speed limits. A plurality of vehicle speed reference signals are provided together with an aspect interlock means arranged to allow selection of a speed reference signal in accordance with the most restrictive aspect indicated by the range and local route speed limit signals. This speed reference signal so selected is then compared with a signal proportional to actual vehicle speed to provide a speed error signal. The error signal so provided may be utilized in any desired manner to control the speed of the vehicle such as, for example, in the foregoing referenced co-pending application Ser. No. 418,132 entitled "Automatic Control System for Vehicles." The invention, therefore, provides an arrangement for fail-safe selection of minimum speed commands from a comparison of local wayside speed limits and traffic separation distance and utilizing a single common set of speed reference signal sources.

The novel features believed characteristic of the present invention are pointed out with particularity in the appended claims. The invention itself, however, both as to its organization and method of operation, as well as further objects and advantages thereof, may best be understood by reference to the following description taken in conjunction with the accompanying drawing in which:

Figures 1, 2:
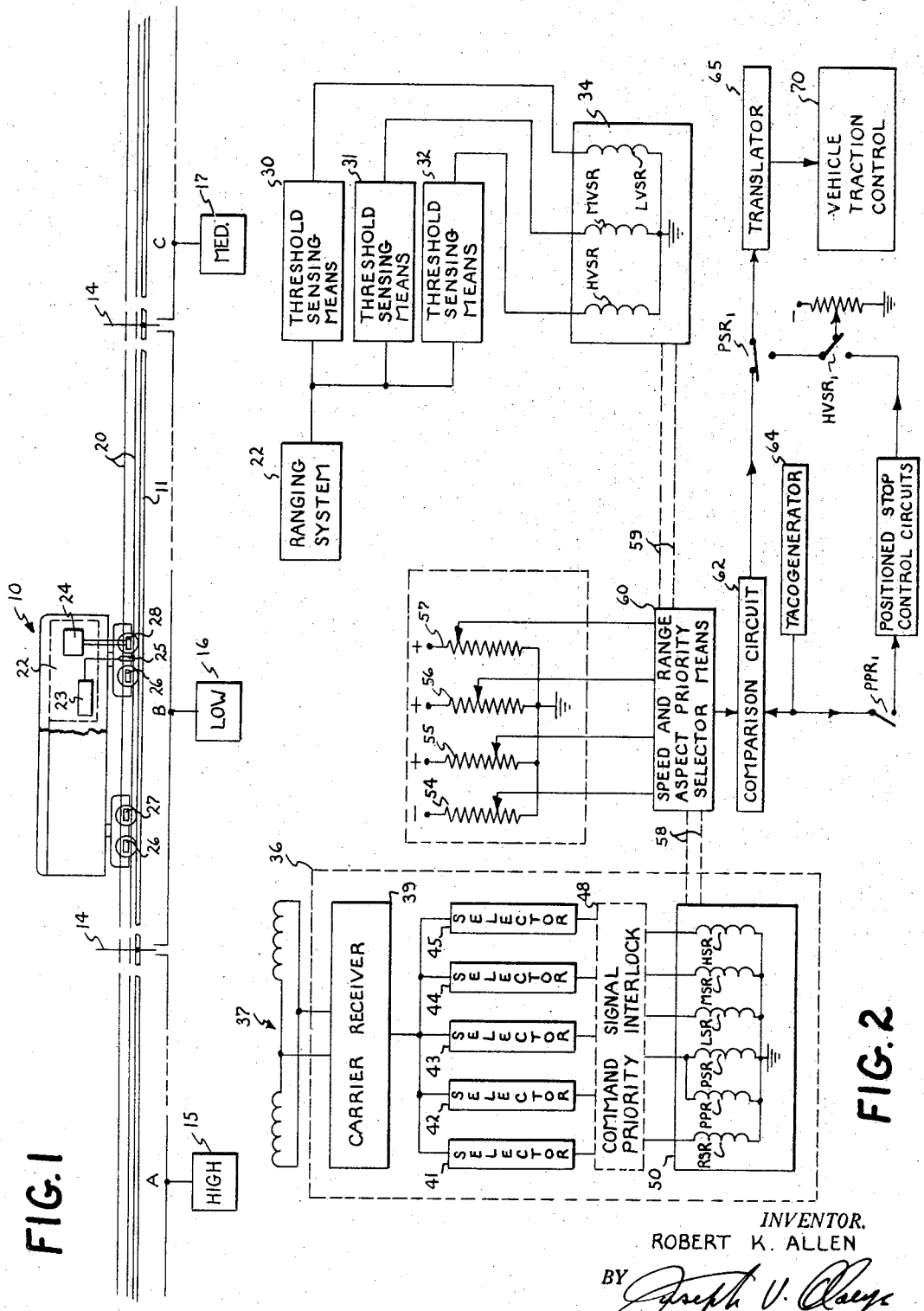
FIGURE 1 represents a railway vehicle which is equipped with control apparatus provided in accordance with this invention.
FIGURE 2 is a block diagram of the system of the present invention.

In FIGURE 1 there is shown a vehicle 10 which follows the fixed route provided by the track 11. The operation of vehicle 10 is arranged to be controlled automatically in accordance with local track conditions, as represented by wayside speed limit signals, and the condition of traffic in advance, as represented by a range signal derived on board the vehicle the value of which range signal increases as a function of increasing distance between vehicle 10 and an obstruction, such as another vehicle, in advance.

The various wayside speed limit signals for the different track regions are arranged to be transmitted throughout discrete communication zones corresponding to such regions. Any suitable communication or signaling system may be employed, such as for example, an inductive carrier system wherein the discrete communication zones are provided by separate wayside inductive loops. Alternatively, the discrete communication zones may be provided by separate track sections if a conventional coded track circuit type of signaling system is employed.

For simplicity of explanation, track 11 in FIGURE 1 is shown divided into zones A, B and C by the dividers 14. Dividers 14 do not necessarily physically divide the track rails although such actual physical division may be provided when the conventional insulated joint track circuit type signaling system is utilized. Although in any particular railway system various factors determine the maximum speed limit to be assigned to the different regions along the route, for purposes of explanation zone A is shown as being assigned a high speed limit, zone B a low speed limit and zone C a medium speed limit which may correspond to speeds of 70, 30 and 50 miles per hour, for example. The zones A, B and C may be assigned local speed limits in any particular order and in many practical railway systems there will, of course, be regions where the local speed limits assigned could as well proceed from high, medium and low as from low, medium and high. The point is that as contrasted to the conventional block system approach, the speed limit signals do not necessarily appear in the order from high to low. Electrical signals representing these different speed limits are illustrated as being supplied to the communication zones associated with such track regions by the transmitters 15, 16 and 17 respectively.

The condition of traffic in advance of the vehicle determines whether or not the vehicle may travel safely at the maximum allowable speed assigned a given zone. In the system of the present invention the condition of traffic in advance is represented by a range signal derived on board the vehicle and which range signal increases in value as a function of increasing distance between the vehicle 10 and an obstruction in advance. Preferably, the range signal is provided by a ranging system of the type disclosed and claimed in the foregoing referenced application of Bolster et al., Ser. No. 297,789, the disclosure of which is intended to be incorporated herein by reference. Accordingly, a transmission line 20 extends along the track 11. As described in detail in such co-pending application, the ranging system, generally designated at 22 in FIGURE 1, includes a transmitter 23 and a receiver 24. Transmitter 23 is provided with an energy coupling device 25 for supplying energy to the line 20. To assure propagation of wave energy in transmission line 20 in one direction only, vehicle 10 is provided with energy reflecting devices 26 and an energy absorbing device 27. The input of receiver 24 is connected to a signal extracting means 28. Signal extracting means 28 extracts a first signal from the transmitted energy in line 20 and a second signal from the reflected energy therein. These two signals extracted from transmission line 20 are then suitably phase compared to continuously provide a measurement of the distance between vehicle 10 and a vehicle in advance, as described in more detail in the co-pending application.

The incorporation of the range signal with the wayside speed limit signals in the system of this invention may best be understood by reference to the block diagram of the complete system shown in FIGURE 2. As shown, the system includes the ranging system 22 which, as shown in FIGURE 1, includes the transmitter 23, receiver 24, energy coupling device 25 and signal extracting means 28, together with the reflecting and absorbing devices 26 and 27. The range signal derived by the ranging system 22 is applied in common to a plurality of threshold sensing means 30, 31 and 32. Each threshold sensing means is arranged to be actuated at a different discrete value of the range signal. Thus, for example, at some preselected minimum range signal value, indicating a small separation between vehicles, none of the threshold sensing means may be actuated while at some preselected maximum range signal value, indicating a large separation between vehicles, all of the threshold sensing means might be actuated. Actuation of a given threshold sensing means is arranged to provide a specific range aspect indication; the actuation of several together being arranged to provide a discrete band of vehicle separation distances such as, for example, high, medium and low.

Any desired number of threshold sensing means may be employed; however, for purposes of simplification, only three have been illustrated in FIGURE 2 and designated at 30, 31 and 32. Sensing of the different range signal levels is then utilized to provide the desired number of range aspect indications. Conveniently, this may be provided, as shown, by causing a range aspect relay to be actuated by each of the threshold sensing means. For the particular arrangement selected for illustration, therefore, the output of each of the threshold sensing means 30, 31 and 32 is fed to a range aspect indicating means 34 which includes a number of relays one associated with each of the devices 30, 32. Each of the relays when actuated provides a specific output indicative of a specific one of the range aspects provided in the system.

For ease of identification of the range aspect relays and the contacts associated therewith, they have been designated by letters indicating their function. Thus, threshold sensing means 30 is operative to provide an indication of low vehicle separation by causing the actuation of Low Vehicle Separation Relay (LVSR), means 31 provides an indication of medium vehicle separation by actuation of Medium Vehicle Separation Relay (MVSR) and means 32 provides an indication of high vehicle separation by actuation of High Vehicle Separation Relay (HVSR).

The system also includes a suitable receiver means 36 for receiving, selecting and translating electrical wayside speed limit signals to provide a speed aspect indication corresponding to such speed limit. For purposes of describing a particular embodiment of this invention, a tone modulated carrier type communication system has been selected. In such a system, different tone frequencies are designated to specify preselected commands, such as for example, stop or speed limit commands. Such tones are illustrated schematically as being supplied to the communication zones A, B and C by the tone transmitters 15, 16 and 17 respectively, in FIGURE 1, Receiver means 36 is provided with a suitable signal coupling device, indicated generally at 37 as a coil. The schematic representation of signal coupling device 37 as a coil is intended to designate whatever signal coupling device is suitable for use with the particular communication system employed and may be, therefore, an antenna, a pick up coil or other suitable device.

Since various receiver means suitable for use with this invention are well known in the art, only so much of the receiver means has been schematically shown and is being briefly described as is believed useful in further illustrating and explaining the present invention. In a frequency modulation system, for example, the receiver includes an input filter which passes only the desired frequencies which are then suitably amplified, limited and fed to a discriminator where the audio frequency component (tone) is recovered in well known manner. This audio frequency tone then operates its tone selector whose output may be a relay.

As illustrated schematically in FIGURE 2, therefore, the tone modulated carrier at signal coupling device 37 is applied to the input of a suitable carrier receiver 39. The output of carrier receiver 39 is applied in common to a plurality of tone selectors designated 41, 42, 43, 44 and 45, each of which is responsive to a preselected tone modulation frequency only. It will be understood that as many tone selectors as desired may be employed, the number ordinarily being determined by the requirements of the particular control system and the number of different command signals from wayside required by such system. In the particular arrangement selected for illustration, speed limit as well as positioned stop signals are to be provided for the system. Accordingly, a selector corresponding to each of these signals is illustrated. To this end, selector 41 responds to a zero (0) speed limit tone; selector 42 to a positioned stop (PS) tone; selector 43 to a low speed (LS) tone; selector 44 to a medium speed (MS) tone and selector 45 to a high speed (HS) tone.

The output of each of the selectors 41-45 is utilized to provide a specific speed aspect indication corresponding to the signal received from wayside. Conveniently, this may be provided by allowing actuation of the selector output relay to indicate the speed aspect. To assure more absolute fail-safe operation of the system, which is often desired, and even required on certain applications such as rapid transit systems for example, a suitable command signal priority interlock means may be provided. Such a priority interlock means is arranged to provide operation of the vehicle at the most restrictive aspect even though two or more aspect indications, due to some fault condition, may be present. For example, a false signal from the low speed selector while a correct high speed signal is present would cause the vehicle to operate in accordance with the low speed aspect indication.

Figure 3:
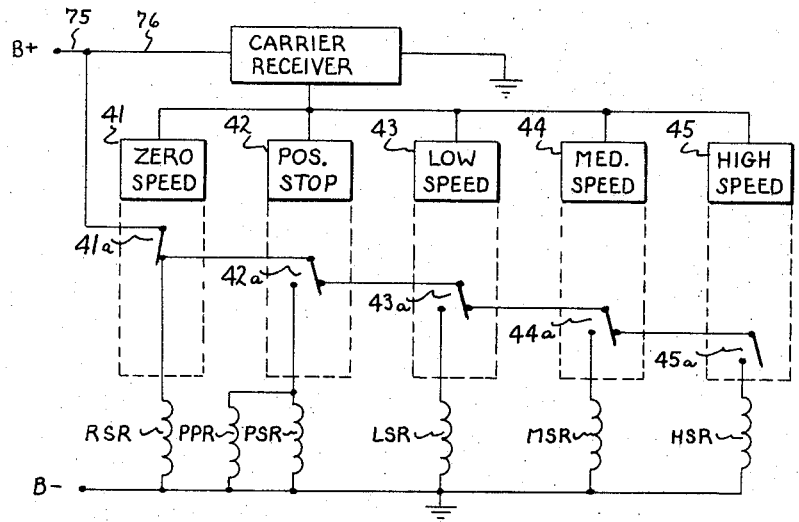
FIGURE 3 is a schematic diagram of a suitable command signal priority interlock arrangement.

For the particular arrangement selected for illustration, therefore, the output of each of the selectors 41-45 is applied through a command signal priority interlock 48 to a speed aspect indicating means 50. One suitable interlock arrangement is illustrated in FIGURE 3, the details of which will be described later, with reference to that figure. Speed aspect indicating means 50 includes a number of relay coils, which number corresponds to the number of aspect indications required for the particular system. For example, the zero (0) speed limit selector 41 is operative to actuate the Remove Stop Relay (RSR), selector 42 is operative to actuate both the Positioned Stop Program Relay (PPR) and the Positioned Stop Relay (PSR), selector 43 the Low Speed Relay (LSR) and so on. The reason for the Positioned Stop Program Relay (PPR) and its actuation with actuation of the PSR Relay will be described in more detail hereinafter.

For more ready identification of the various aspect relays they have been designated, as indicated by the foregoing, by the first letters of the words indicating their function. Also, the various contacts of such relays are given similar designations with appropriate numeral subscripts when necessary.

The system also includes a number of separate reference signal sources shown in FIGURE 2 by the potentiometers 54, 55, 56 and 57. For simplicity, only four reference signal sources have been shown with signal source 54 providing a zero (0) speed reference signal, source 55 a low speed reference signal, source 56 a medium speed reference signal and source 57 a high speed reference signal.

Figure 4:
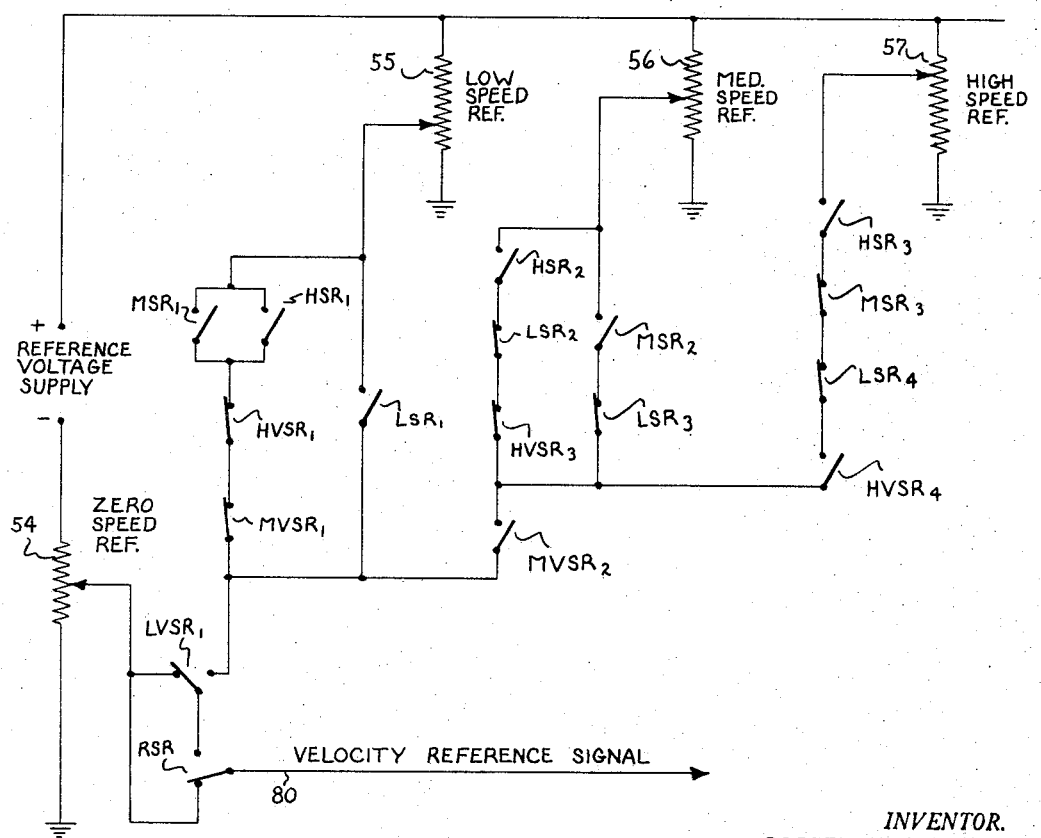
FIGURE 4 is a schematic diagram of a speed and range aspect interlock arrangement suitable for use in the present invention.

A specific one of the speed reference signals is then suitably selected in accordance with the most restrictive of the aspect indications provided from the speed and range portions of the system. To this end, a speed and range aspect priority selector means 60 is provided, one particular arrangement of which is illustrated in FIGURE 4 by a suitable priority interlocking of contacts of the relays of the range aspect indicating means 34 and speed aspect indicating means 50. A more detailed description of such arrangement will be provided later in connection with that figure since such details are not required at this time for an understanding of the overall operation of the system.

Speed and range priority selector means 60 is shown, schematically, as being operatively associated with range aspect indicating means 34 and speed aspect indicating means 50 by means of the broken lines 58 and 59 respectively. Speed and range aspect priority selector means 60 is operative to select the reference signal corresponding to the lowest order aspect indication; that is, the most restrictive of the speed or range aspect indications. The reference signal so selected by priority selector means 60 is applied to a comparison circuit 62 to which there is also applied a signal proportional to the actual speed of the vehicle to provide an error signal. The signal proportional to the actual velocity of the vehicle is shown as being produced by a tachogenerator 64 which, conveniently, is driven by one of the vehicle axles. Thus, the output of comparison circuit 62 represents the velocity error between the actual vehicle velocity and the desired or reference velocity. This velocity error signal may be utilized in any suitable manner to control the vehicle traction; that is, the propulsion or braking of the vehicle.

When this invention is to be utilized with a vehicle control system of the type disclosed in the foregoing Allen and Lichtenfels application, Ser. No. 418,132, for example, the error signal so derived would be applied through a Positioned Stop Relay contact ($PSR_1$) and a contact of the High Vehicle Separation Relay, $HVSR_1$, to a translator circuit 65 and through the translator circuit to the vehicle traction control 70. As described in the referenced Allen and Lichtenfels application, translator 65 is operative to convert the velocity error signal into a control signal which varies in magnitude only (not polarity) with respect to a point of reference potential. This control signal may then be utilized in the manner described in detail in that application to vary the vehicle traction. For example, the control signal is applied to the traction control means 70 which means operates to control the application of propulsion effort (positive traction) or braking effort (negative traction) to the vehicle in accordance with that control signal. Thus, although for simplicity of illustration traction control means 70 is shown as a single functional block, it is to be understood that vehicle traction control means 70 controls both propulsion and braking which is described herein as positive and negative traction, respectively.

As shown in FIGURE 2 energization of the positioned stop selector in receiver means 36 causes actuation of the contacts PPR and PSR. Actuation of contact $PPR_1$ operates to initiate operation of the positioned stop control circuitry while actuation of contact $PSR_1$ provides for transfer from the speed control to the positioned stop control portion of the system. For example, until a positioned stop signal is received on board the vehicle, vehicle traction is controlled in accordance with the error signal derived from the comparison between the actual velocity of the vehicle and the desired or reference velocity thereof. When a positioned stop signal is received on board the vehicle, however, vehicle traction is to be controlled in accordance with the error signal derived from a comparison between the actual distance of the vehicle to the desired stopping point and a programmed distance to such point.

From the foregoing it will become apparent that if a positioned stop signal is received when there is another vehicle between the controlled vehicle and the desired stopping point, safe operation would not be provided by a simple transfer to the positioned stop control signal. It is desirable, however, that the positioned stop program begin as soon as the positioned stop signal is received.

One arrangement for overcoming any difficulty in this respect is to connect the input of translator 65 to a suitable point of reference potential so as to cause the vehicle to come to a stop unless the ranging system 22 is providing for a high vehicle separation range aspect indication. As shown in FIGURE 2, therefore, with $PSR_1$ actuated, actuation of $HVSR_1$ operates to apply the signal from the positioned stop control circuitry to the input of translator 65 through $PSR_1$. If $HVSR_1$ is not actuated, however, indicating a separation between vehicles of less than the high vehicle separation range aspect, then the input of translator 65 is brought to the selected point of reference potential, provided by potentiometer 75, through $PSR_1$ and $HVSR_1$ causing the vehicle to come to a stop. As soon as the obstruction between the controlled vehicle and the desired stopping point has been cleared so that the high vehicle separation range aspect is indicated, $HVSR_1$ is actuated and the vehicle may then be controlled by the signal from the positioned stop control circuitry. Further details of the positioned stop control circuitry may be had, if desired, from the referenced Allen and Lichtenfels application.

In explaining the operation of the foregoing described system let it be assumed, initially, that vehicle 10 is moving within the zone B, as illustrated in FIGURE 1, and there is no other vehicle or obstruction in advance. Under such conditions a range signal of maximum value will be derived by the ranging system 22 which is operative to cause energization of all the threshold sensing devices 30, 31 and 32. As a result, relay coils LVSR, MVSR and HVSR are energized to cause actuation of the contacts associated therewith. At the same time, since vehicle 10 is moving within zone B, it is receiving a low speed limit command signal from wayside. The reception of the low speed limit command signal causes energization of selector 43 which in turn causes the coil of low speed relay (LSR) to be energized to actuate the contacts thereof.

With a high vehicle separation aspect indication but a low speed limit aspect indication, selector means 60 is operative to cause the selection of the low speed reference signal from signal source 55 for comparison with the actual vehicle speed signal from tachogenerator 64.

Assume now that the vehicle is in a zone, such as zone A, with another vehicle in advance thereof at a distance such that a low vehicle separation aspect is indicated. Under that condition, even though the vehicle is receiving a high speed limit signal from zone A, selector means 60 operates to select the low speed reference signal as required by the presence of a low vehicle separation aspect indication.

From the foregoing it is evident that since the lower order aspect indication, either speed or range, determines which speed reference signal is selected for comparison with the actual vehicle speed signal, both the speed limit signal and the range signal can operate to provide an override limit on the system tractive effort command.

In the foregoing described system fail-safe operation is provided by a command signal priority interlock means 48. This command signal interlocking may be accomplished in any suitable manner, one particular arrangement being illustrated in FIGURE 3 by a suitable interlocking of selector relay contacts. As shown in FIGURE 3, therefore, a set of contacts designated by the letter $a$ is associated with each of the selectors 41–45. For example, the set of contacts associated with selector 41 are designated by the reference numeral 41$a$, those with selector 42 by reference numeral 42$a$ and so on with the contacts associated with selector 45 being designated by the reference numeral 45$a$. The respective contacts 41$a$–45$a$ are arranged to be actuated by their associated selector upon application to that selector of its particular tone.

In operation, control power is connected to carrier receiver 39 through conductors 75 and 76. The various contacts 41$a$–45$a$ are arranged, when actuated, to control the energization of the various command relay coils which, for the arrangement illustrated, are respectively, the remove stop relay (RSR), the position stop program relay (PPR), the positioned stop relay (PSR), the low speed relay (LSR), the medium speed relay (MSR) and the high speed relay (HSR).

An examination of the arrangement of FIGURE 3 shows that the contacts 41$a$–45$a$ are connected in a priority interlocked fashion with zero (0) speed having first priority, positioned stop next priority and so on with high speed having last priority. Accordingly, if a zero speed tone is applied from carrier receiver 39 to the zero speed selector 41, contact 41a is actuated causing the remove stop relay (RSR) to be de-energized and also removing the power connection (conductor 75) from the remaining contacts 42a–45a, so that none of the higher order conditions can be implemented even though under fault conditions a tone may be simultaneously applied to one of the other selectors 42–45. Similarly, if the positioned stop selector 42 is energized to move contact 42a, control power is thereby simultaneously removed from contacts 43a, 44a and 45a so that the relays LSR, MSR and HSR cannot be energized. The same hierarchy is observed throughout the priority ladder as illustrated. This provides redundancy to guard against failure of the type wherein a higher and a lower order selector are energized simultaneously as a result of some fault condition. Since the lower order is arranged to take precedence, fail-safe operation is assured. Also to assure that the positioned stop program will begin whenever a positioned stop signal has been received, actuation of the positioned stop selector contact is operative to cause energization of both the positioned stop relay (PSR) and the positioned stop program relay (PPR). Further details of the positioned stop control circuitry may be had by reference to the foregoing referenced Allen and Lichtenfels application, Ser. No. 418,132.

It will be understood that the foregoing priority interlock arrangement has been given by way of example only and is not, per se, a part of the present invention. When fail-safe operation is desired the foregoing, or other suitable priority interlock arrangement, may be employed. For those applications where fail-safe operation is not such an important consideration, the system need not be provided with a priority interlock arrangement.

The selection of the speed reference signal by speed and range aspect selector means 60 may be accomplished in any suitable manner, one particular arrangement being illustrated in FIGURE 4. As shown therein, contacts of the relays of the range aspect indicating means 34 and the speed aspect indicating means 50 are suitably interlocked in a priority ladder type arrangement. In FIGURE 4 all relay contacts are shown in the positions they assume when their associated relays are de-energized. For safe operation remove stop relay (RSR) is normally energized and reception of a zero speed signal de-energizes the relay. All other relays, however, are normally de-energized and are energized when the selector or threshold sensing means with which they are associated is energized.

As in FIGURE 3 the zero, low, medium and high speed reference signal sources are shown as the potentiometers 54, 55, 56 and 57 respectively. As shown, the reference signal sources are arranged to be connected to the velocity reference signal line 80, which would be connected to one input of comparison circuit means 62, through a series of relay contacts. The arrangement of the relay contacts is such that a particular reference signal source can only be connected to reference signal line 80 when a particular combination of relays in both the range aspect indicating means 34 and the speed aspect indicating means 50 are actuated. For example, as long as there is a zero speed limit signal present, signal line 80 will be connected to the zero speed reference potentiometer 54 through the RSR contact causing the vehicle to come to a stop. Similarly, even though a zero speed limit signal is not present, signal line 80 will still be connected to the zero speed reference potentiometer 54 if the ranging system does not provide at least a low vehicle separation aspect indication causing actuation of contact $LVSR_1$. That is, if the output from ranging system 22 is not of sufficient magnitude to cause energization of at least the low vehicle separation relay (LVSR), then the vehicle will be caused to come to a stop even though a high, medium or low speed limit signal may be present.

The low speed reference potentiometer 55 can be connected to signal line 80 as long as a zero speed limit is not present, there is at least a low vehicle separation aspect indication and a speed aspect indication of either low, medium or high. Thus, with both RSR and $LVSR_1$ actuated, signal line 80 will be connected to the low speed reference potentiometer 55 upon actuation of the $LSR_1$ contact. Signal line 80 would also be connected to the slow speed reference potentiometer 55 if $MSR_1$ or $HSR_1$ are actuated but neither contacts $HVSR_1$ or $MVSR_1$ have been actuated. That is, if either $HVSR_1$ or $MVSR_1$ has been actuated as well as either $MSR_1$ or $HSR_1$ then one of the higher order reference signal potentiometers could safely be connected to signal line 80.

Similarly, the high speed reference potentiometer 57 will be connected to signal line 80 if no zero speed limit signal is present, the low, medium and high range aspect indicating relays have been energized to actuate contacts $LVSR_1$, $MVSR_2$ and $HVSR_4$, and there is a high speed aspect indication, causing actuation of contact $HSR_3$, but no lower order speed aspect indication which would cause actuation of contacts $LSR_4$ or $MSR_3$. The connection of signal line 80 to the medium speed reference potentiometer 56 may be traced out in a similar manner.

From the foregoing description, therefore, it can be seen that the various relay contacts of the range and speed aspect indicating relays are arranged in a priority interlocked manner with the lower order indications having higher priority. Thus, for example, zero speed and vehicle separation less than the low vehicle separation aspect indication have first priority, low vehicle separation next priority, low speed next, medium vehicle separation next and so on with high speed aspect indication having last priority.

The various circuit portions of the foregoing illustrated embodiment of the invention have been shown diagrammatically in order to simplify such illustration as well as to facilitate and simplify the explanation of the invention. Accordingly, the drawings have been made to make it as easy as possible to understand the principles and mode of operation of the invention rather than to illustrate any specific construction or arrangement of parts that might be employed in any specific practical application.

Accordingly, while there has been shown and described the fundamental novel features of the invention as applied to a simplified embodiment thereof, many changes, modifications and additions will occur to those skilled in the art. It is to be understood, therefore, that the appended claims are intended to cover all such changes, modifications or additions as fall within the true spirit and scope of the invention.

What I claim as new and desire to secure by Letters Patent of the United States is:

1. In a system for automatically controlling the operation of vehicles in accordance with local route conditions, the combination comprising:
   (a) receiver means responsive to signals from wayside representing maximum speed limits for selectively energizing devices establishing corresponding speed aspect indications on board said vehicle;
   (b) means on board said vehicle for deriving a range signal which increases in value as a function of increasing distance between said vehicle and an obstruction in advance thereof;
   (c) means responsive to said range signal for selectively energizing devices establishing a number of discrete range aspect indications;
   (d) a plurality of reference signal sources;
   (e) selector means operative to provide for the selection of a reference signal source in accordance with the lowest order aspect indication established; and
   (f) means for comparing the reference signal so selected with a signal proportional to the actual speed of said vehicle to provide an error signal.

2. The control system of claim 1 wherein said devices establishing speed and range aspect indications are relays.

3. The control system of claim 2 wherein said selector means includes a priority interlocking arrangement of contacts of the relays establishing said speed and range aspect indications.

4. The control system of claim 1 wherein said means for establishing a number of discrete range aspect indications includes a number of channels each including a threshold sensing means, each threshold sensing means providing for an output at a different level of the range signal.

5. The control system of claim 1 wherein the means for deriving said range signal includes a ranging system of the type wherein a continuous range signal is derived from the transmitted and reflected wave energy in a transmission line extending along the route of travel of said vehicle.

6. The control system of claim 4 wherein the means for deriving said range signal includes a ranging system of the type wherein a continuous range signal is derived from the transmitted and reflected wave energy in a transmission line extending along the route of travel of said vehicle.

7. In a system for automatically controlling the operation of vehicles in accordance with local route conditions, the combination comprising:
   (a) receiver means responsive to signals from wayside representing maximum speed limits for selectively energizing devices establishing corresponding speed aspect indications on board said vehicle;
   (b) means on board said vehicle for deriving a range signal which increases in value as a function of increasing distance between said vehicle and an obstruction in advance thereof;
   (c) means applying said range signal in common to a plurality of different channels each including a threshold means operative to block all energy having less than a given amplitude which amplitude is different for each of said channels;
   (d) devices arranged in said channels adapted to be actuated by said range signal to provide a plurality of discrete range aspect indications;
   (e) a plurality of reference signal sources;
   (f) selector means operative to provide for the selection of a reference signal source in accordance with the lowest order aspect indication established; and
   (g) means for comparing the reference signal so selected with a signal proportional to the actual speed of said vehicle to provide an error signal.

8. The control system of claim 7 wherein said devices arranged in said channels and in said receiver means are relays.

9. The control system of claim 8 wherein said selector means includes a priority interlocking arrangement of contacts of the relays establishing said speed and range aspect indications.

No references cited.

EVON C. BLUNK, *Primary Examiner.*

S. T. KRAWCZEWICZ, *Assistant Examiner.*